(12) United States Patent
Pan et al.

(10) Patent No.: US 9,478,258 B2
(45) Date of Patent: *Oct. 25, 2016

(54) METHOD OF RECORDING MULTIPLE HIGHLIGHTS CONCURRENTLY

(71) Applicant: CARNEGIE TECHNOLOGY INVESTMENT LIMITED, Tortola (GB)

(72) Inventors: Chongguang Pan, Dalian (CN); Bingyu Li, Dalian (CN)

(73) Assignee: CARNEGIE TECHNOLOGY INVESTMENT LIMITED, Tortola (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,660

(22) Filed: Feb. 25, 2015

(65) Prior Publication Data

US 2016/0247540 A1  Aug. 25, 2016

(51) Int. Cl.
| | |
|---|---|
| *H04N 5/77* | (2006.01) |
| *H04N 9/80* | (2006.01) |
| *G11B 27/30* | (2006.01) |
| *G11B 31/00* | (2006.01) |
| *G11B 27/34* | (2006.01) |
| *G11B 27/036* | (2006.01) |

(52) U.S. Cl.
CPC ............. *G11B 27/30* (2013.01); *G11B 27/036* (2013.01); *G11B 27/34* (2013.01); *G11B 31/006* (2013.01)

(58) Field of Classification Search
USPC ......................... 386/223–224, 239–241, 248
See application file for complete search history.

(56) References Cited

U.S. PATENT DOCUMENTS

| | | | | |
|---|---|---|---|---|
| 2003/0177503 | A1* | 9/2003 | Sull | G06F 17/30796 725/112 |
| 2009/0279839 | A1* | 11/2009 | Nakamura | G11B 20/10 386/248 |
| 2010/0278509 | A1* | 11/2010 | Nagano | H04N 9/8227 386/230 |
| 2011/0280545 | A1* | 11/2011 | Kates | H04N 5/76 386/235 |
| 2015/0312652 | A1* | 10/2015 | Baker | H04N 21/8549 386/281 |

* cited by examiner

*Primary Examiner* — Nigar Chowdhury
(74) *Attorney, Agent, or Firm* — Leong C. Lei

(57) ABSTRACT

A method of recording multiple highlights concurrently includes steps of collecting N game videos concurrently, choosing one of the game videos to execute a highlight recording treatment, inserting an in point and an out point for a highlight picture, and concurrently copying time position information of the aforementioned in point and the out point of the game video in N−1 video games to form respective highlight segment records. Thus, human and material resources involved in collecting videos at multiple viewpoints for the sport live broadcast can be largely reduced.

2 Claims, No Drawings

METHOD OF RECORDING MULTIPLE HIGHLIGHTS CONCURRENTLY

TECHNICAL FIELD OF THE INVENTION

This invention relates particularly to a method of recording multiple highlights concurrently.

DESCRIPTION OF THE PRIOR ART

When there is a live sport game, multiple cameras and video recorders are used to collect on-site videos at many viewpoints simultaneously, and the broadcasting site switches and replays highlights, i.e., highlight video clips or highlight reels, made by the above video sources. Editors inspect the collected video sources, make an insertion of an in point when a highlight picture appears and an insertion of an out point when the highlight picture finishes in order to store highlight video segments, and input an address and a name to be recorded in order to form a key word index. If the live broadcast needs the playback, the corresponding video is searched and found. Generally, when one recorder records a highlight in one input video, another highlight in another input video cannot be recorded at the same time. Thus, multiple recorders are needed to collect videos at multiple viewpoints in the sport game for satisfying the needs of the live broadcast.

SUMMARY OF THE INVENTION

It is an object of this invention to provide a method of recording multiple highlights concurrently which largely reduces human and material resources involved in collecting videos at multiple viewpoints for the live broadcast and decreases incorrect operations caused by human error effectively.

The method of recording multiple highlights concurrently in accordance with this invention comprises following steps:

step 1 for collecting N game videos concurrently, names of which are respectively defined by $A_1, A_2, \ldots, A_N$, and selecting one of the game videos to execute a highlight recording treatment;

step 2 for inspecting the selected game video and inserting an in point and an out point for a highlight picture in order to form a highlight segment record. The record at least includes a game video name $A_1$ and time position information of the in point and the out point in the game video;

step 3 for setting a file name for the highlight segment record manually or automatically and loading the highlight segment record into a standby list prepared for a playback;

step 4 for generating N−1 highlight segment records concurrently by referring to the highlight segment record generated in the step 2. The N highlight segment records have the same time position information of the in point and the out point in the game video but have different game video names which are respectively defined by $A_1, A_2, \ldots, A_N$;

step 5 for setting file names for the N−1 highlight segment records manually or automatically and loading the highlight segment records into the standby list prepared for the playback; and step 6 for searching the needed highlight segment record from the standby list as the playback is in action, getting contents stored in the record, and finding the corresponding game video and a start position and an end position of a highlight segment. The start position and the end position of the highlight segment can be adjusted slightly forward or backward according to needs in a live broadcast.

Preferably, if the step 2 inserts the out point automatically, the method presets a rule for inserting the out point, sets different time durations or a single time duration according to a real situation of a game, inserts the in point when the highlight picture appears, automatically finds out the rule whereby the out point is inserted, gets corresponding time duration data according to the selected rule, and calculates a position where the out point is inserted according to the time duration data and a position of the in point.

Preferably, the step 1 further connects a game information system if the step 3 and step 5 set the file name for the highlight segment record automatically. The game information system provides messages about people and motions according to a development of the game. The file name of the highlight segment record is automatically generated according to the messages in combination with a preset file name generating strategy.

This invention discloses a method which collects N game videos concurrently, selects one of the game videos to execute a highlight recording treatment, inserts an in point and an out point for a highlight picture, and copies the time position information of the aforementioned in point and the out point of the game video in N−1 video games concurrently to form respective highlight segment records. Therefore, human and material resources involved in collecting videos at multiple viewpoints for the sport live broadcast can be largely reduced. Because the video games at multiple viewpoints concurrently collected from the sport game have the same time point when the highlight picture appears, the principle of this invention uses the time point of the highlight segment in one of the game videos as a reference to allow the highlight segment to be found at the same time point of other game videos. Furthermore, the highlight segment prepared for the playback in this invention is not the independent stored video data captured from the game video. This invention records the start time and the end time of the highlight segment in the game video directly. The end time can be automatically generated according to the preset rule which inserts the out point, so the situation of copying and generating the N−1 highlight segment records simultaneously can be obtainable. This invention keeps storing video signals during the live broadcast. When the highlight segment is accessed for the playback, this invention acquires the game video name and the information of the start time and the end time of the highlight segment in the game video instead of adopting the video data practically stored. The start position and the end position of the highlight segment can be adjusted slightly forward or backward according to needs in the live broadcast. The broadcasting site can also decide when to switch to other input signals Thus, the occurrence of a blank screen caused by a switching delay is prevented, and incorrect operations caused by human error are decreased effectively.

If the traditional method is adopted, the traditional method which stores highlights independently does not have video data when the record is past the end point, and the blank screen appears if the end point of the record is not switched to other input signals. This incurs a broadcast accident inevitably. Furthermore, the recorded highlight of the traditional method can only adjust contents of the live broadcast backward from the start position of the highlight and forward from the end position thereof. Therefore, the operator is required to pay high attention to his work. If there are errors in the record, the time point for playing cannot be adjusted freely and cannot satisfy the needs, and the flexibility may become worse.

DETAILED DESCRIPTION OF THE PREFERRED EMBODIMENTS

The method of recording multiple highlights concurrently of this invention comprises following steps:

Step 1 for collecting N game videos simultaneously, names of which are respectively defined by $A_1, A_2, \ldots, A_N$, and selecting one of the game videos to execute a highlight recording treatment.

Step 2 for inspecting the selected game video and inserting an in point and an out point for a highlight picture in order to form a highlight segment record. The record at least includes a game video name $A_1$ and time position information of the in point and the out point in the game video.

Step 3 for setting a file name for the highlight segment record manually or automatically and loading the highlight segment record into a standby list prepared for a playback.

Step 4 for generating N-1 highlight segment records concurrently by referring to the highlight segment record generated in the step 2. The N highlight segment records have the same time position information of the in point and the out point in the game video but have different game video names. The game video names are respectively defined by $A_1, A_2, \ldots, A_N$.

Step 5 for setting file names for the N-1 highlight segment records manually or automatically and loading the highlight segment records into the standby list prepared for the playback.

Step 6 for searching the highlight segment record which is needed from the standby list as the playback is in action, getting contents stored in the record, and finding the corresponding game video and a start position and an end position of a highlight segment. The start position and the end position of the highlight segment can be adjusted slightly forward or backward according to needs in a live broadcast. To facilitate a video switching action in the live broadcast, a countdown timer can be set at the end position of the highlight segment.

If the step 2 inserts the out point automatically, the method presets a rule for inserting the out point by, for example, setting different time durations or a single time duration according to a real situation of a game, inserts the in point when the highlight picture appears, automatically finds out the rule whereby the out point is inserted, gets corresponding time duration data according to the chosen rule, and calculates a position where the out point is inserted according to the time duration data and a position of the in point. The record at least includes a game video name and time position information of the in point and the out point in the game video.

The step 1 further connects a game information system if the step 3 and step 5 set the file name for the highlight segment record automatically. The game information system provides messages about people and motions according to a development of the game. The file name of the highlight segment record is automatically generated according to the messages in combination with a preset file name generating strategy.

The feature of this invention is to collect N game videos concurrently, choose one of the game videos to execute a highlight recording treatment, insert an in point and an out point for a highlight picture, and copy the time position information of the aforementioned in point and the out point of the game video in N-1 video games concurrently to form respective highlight segment records. Therefore, human and material resources involved in collecting videos at multiple viewpoints for the sport live broadcast can be largely reduced. Because the video games at multiple viewpoints concurrently collected from the sport game have the same time point when the highlight picture appears, the principle of this invention is to find the highlight segment at the same time point of other game videos by referring to the time point of the highlight segment in one of the game videos. Furthermore, the highlight segment prepared for the playback in this invention is not the video data captured from the game video and independently stored. This invention records the start time and the end time of the highlight segment in the game video directly. The end time can be automatically generated according to the preset rule which inserts the out point, so the situation of copying and generating the N-1 highlight segment records simultaneously can be obtainable. This invention keeps storing video signals during the live broadcast. When the highlight segment is accessed for the playback, this invention acquires the game video name and the information of the start time and the end time of the highlight segment in the game video instead of adopting video data practically stored. The start position and the end position of the highlight segment can be adjusted slightly forward or backward in the live broadcast according to needs. The broadcasting site can also decide when to switch to other input signals. Thus, the occurrence of a blank screen caused by a switching delay is prevented, and incorrect operations caused by human error are decreased effectively.

If the traditional method is adopted, the traditional method which stores highlights independently does not have video data when the record is past the end point, and the blank screen appears if the end point of the record is not switched to other input signals. This incurs a broadcast accident. Furthermore, the highlight recorded by the traditional method can only adjust contents of the live broadcast backward from the start position of the highlight and forward from the end position thereof. Thus, the operator is required to pay high attention to his work. If the record has errors, the time point for playing cannot be adjusted freely and cannot satisfy the needs, and the flexibility may become worse.

While the embodiments of this invention are shown and described, it is understood that further variations and modifications may be made without departing from the scope of this invention.

We claim:

1. A method of recording multiple highlights concurrently comprising:
   step 1 for collecting N game videos simultaneously, names of said game videos being respectively defined by $A_1, A_2, \ldots, A_N$, and selecting one of said game videos to execute a highlight recording treatment;
   step 2 for inspecting said selected game video and inserting an in point and an out point for a highlight picture in order to form a highlight segment record, said record at least including a game video name $A_1$ and time position information of said in point and said out point in said game video;
   step 3 for setting a file name for said highlight segment record manually or automatically and loading said highlight segment record into a standby list prepared for a playback;
   step 4 for generating N-1 highlight segment records concurrently by referring to said highlight segment record generated in said step 2, said N highlight segment records having the same time position information of said in point and said out point in said game video but having different game video names, said names of said game videos being respectively defined by $A_1, A_2, \ldots, A_N$;

step 5 for setting file names for said N−1 highlight segment records manually or automatically and loading said highlight segment records into said standby list prepared for said playback; and step 6 for searching said highlight segment record which is needed from said standby list as said playback is in action, getting contents stored in said record, and finding said corresponding game video and a start position and an end position of a highlight segment, said start position and said end position of said highlight segment being capable of being adjusted slightly forward or backward according to needs in a live broadcast;

wherein said step 1 further connects a game information system if said step 3 and step 5 set said file name for said highlight segment record automatically, said game information system providing messages about people and motions according to a development of said game, said file name of said highlight segment record being automatically generated according to said messages in combination with a preset file name generating strategy.

2. The method as claimed in claim 1, wherein if said step 2 inserts said out point automatically, the method presets a rule for inserting said out point, sets different time durations or a single time duration according to a real situation of a game, inserts said in point when said highlight picture appears, automatically finds out said rule whereby said out point is inserted, gets corresponding time duration data according to said selected rule, and calculates a position where said out point is inserted according to said time duration data and a position of said in point.

* * * * *